US008282816B2

(12) United States Patent
Noe

(10) Patent No.: US 8,282,816 B2
(45) Date of Patent: Oct. 9, 2012

(54) EXTRACTIVE DISTILLATION PROCESS AND SYSTEM

(75) Inventor: Robert J. L. Noe, Mount Prospect, IL (US)

(73) Assignee: UOP LLC, Des Plaines, IL (US)

( * ) Notice: Subject to any disclaimer, the term of this patent is extended or adjusted under 35 U.S.C. 154(b) by 456 days.

(21) Appl. No.: 12/431,047

(22) Filed: Apr. 28, 2009

(65) Prior Publication Data

US 2010/0270213 A1 Oct. 28, 2010

(51) Int. Cl.
*C10G 7/08* (2006.01)
*C10G 21/28* (2006.01)
*C07C 7/10* (2006.01)

(52) U.S. Cl. ........................................ 208/313; 585/833

(58) Field of Classification Search .................. 208/313; 585/833
See application file for complete search history.

(56) References Cited

U.S. PATENT DOCUMENTS

| | | | |
|---|---|---|---|
| 3,590,092 A | 6/1971 | Uitti et al. | |
| 3,763,037 A * | 10/1973 | Thompson | .................... 208/313 |
| 3,779,904 A | 12/1973 | Kubek et al. | |
| 3,844,902 A | 10/1974 | Vickers et al. | |
| 3,864,245 A | 2/1975 | Van Tassell | |
| 3,884,769 A | 5/1975 | Mikitenko et al. | |
| 3,944,483 A | 3/1976 | Schwall et al. | |
| 3,966,589 A | 6/1976 | Somekh | |
| 4,053,369 A | 10/1977 | Cines | |
| 4,187,152 A * | 2/1980 | Roth et al. | ........................ 203/62 |
| 4,334,983 A | 6/1982 | Mentzer | |
| 4,363,704 A * | 12/1982 | Berg | .............................. 203/58 |
| 4,469,903 A | 9/1984 | Schmidt | |
| 4,897,182 A | 1/1990 | Maier et al. | |
| 5,008,004 A | 4/1991 | Maier et al. | |
| 5,022,981 A | 6/1991 | Forte | |
| 5,073,669 A | 12/1991 | Forte | |
| 5,139,651 A | 8/1992 | Forte | |
| 5,176,821 A | 1/1993 | Forte | |
| 5,202,520 A | 4/1993 | Forte | |
| 5,225,072 A | 7/1993 | Vidueira | |
| 5,310,480 A | 5/1994 | Vidueira | |
| 5,399,244 A | 3/1995 | Gentry et al. | |
| 6,015,933 A | 1/2000 | Abrevaya et al. | |
| 6,040,489 A | 3/2000 | Imai | |
| 6,660,899 B2 | 12/2003 | McKim et al. | |
| 6,800,253 B2 | 10/2004 | Winter et al. | |
| 7,465,846 B2 | 12/2008 | de Wet et al. | |
| 2009/0038991 A1 | 2/2009 | Wu et al. | |

* cited by examiner

*Primary Examiner* — Randy Boyer
(74) *Attorney, Agent, or Firm* — Mark R Willis

(57) ABSTRACT

One exemplary embodiment can be a process for minimizing a solvent in a raffinate stream of an extractive distillation column. The process can include providing sufficient separation in the extractive distillation column between a reflux stream having an effective amount of water and a stream having an effective amount of solvent. Usually, the reflux stream has no more than about 2,000 ppm, by weight, solvent based on the weight of the reflux stream.

17 Claims, 1 Drawing Sheet

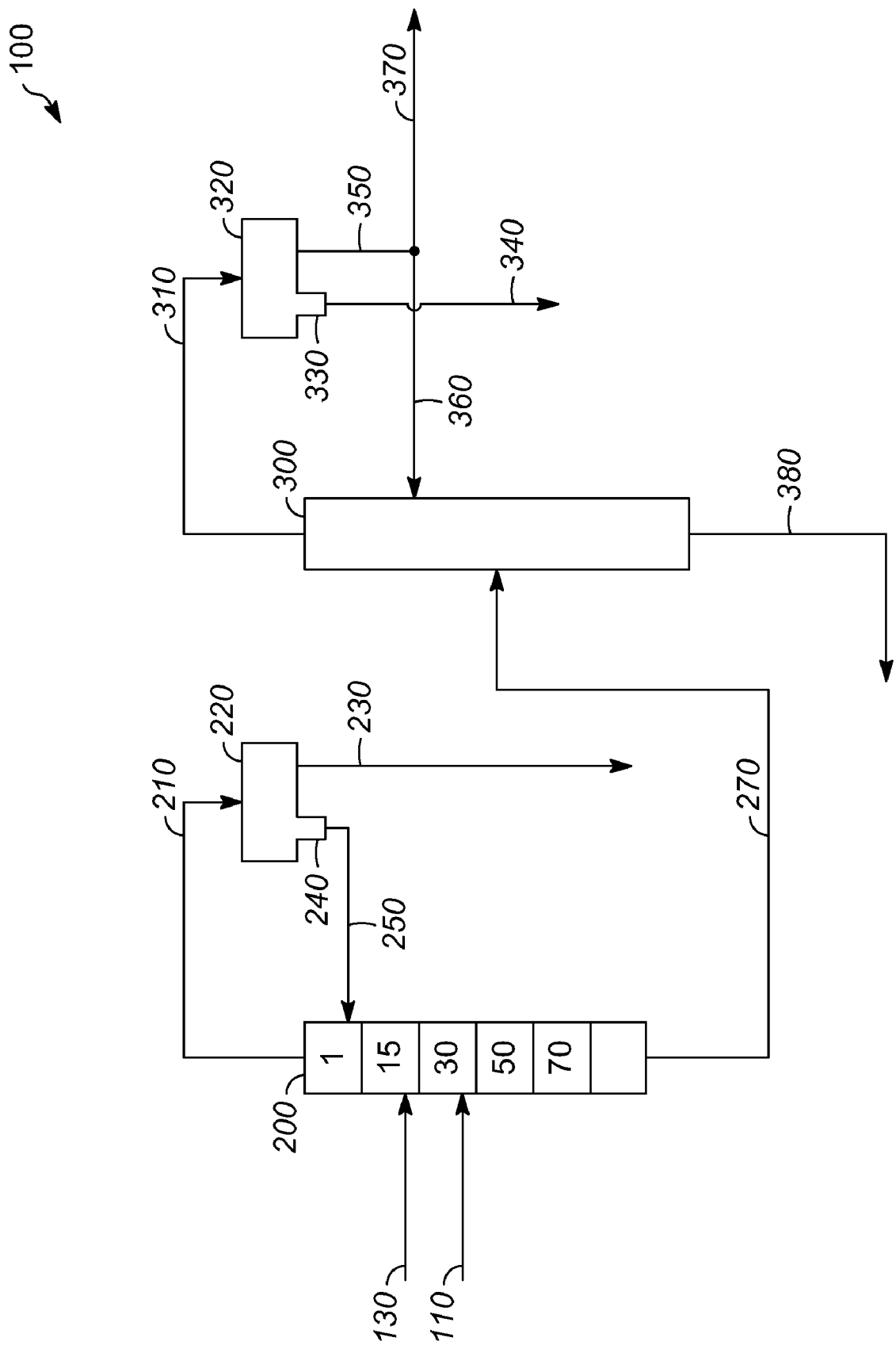

EXTRACTIVE DISTILLATION PROCESS AND SYSTEM

FIELD OF THE INVENTION

This invention generally relates to minimizing a solvent in a raffinate stream of an extractive system.

DESCRIPTION OF THE RELATED ART

Aromatic hydrocarbons, such as benzene, toluene and xylene, can be recovered from various hydrocarbon feedstocks, including catalytic reformates and hydrogenated pyrolysis gasolines. Utilizing an aromatic selective solvent can facilitate the removal of the aromatics from non-aromatic hydrocarbons in, e.g., an extractive process. In some of these processes, two columns may be used. In the first column, a hydrocarbon feedstock can be contacted with a solvent, preferably containing water to enhance the solvent's selectivity, dissolving the aromatic components of the feedstock. The resulting raffinate phase, including one or more non-aromatic hydrocarbons and a minor amount of aromatic hydrocarbons, can exit the overhead of the column. An extract phase including a solvent having aromatic hydrocarbons dissolved therein can exit the bottom of the first column.

The aromatic hydrocarbons contained in the extract may be recovered in the second column to yield an aromatic fraction, and a solvent bottoms fraction can be recycled for re-use in the first column.

In the first column, the raffinate phase along with water can be removed in an overhead stream. Often, at least a portion of this raffinate phase is recycled to the extractive distillation column as a reflux. However, recycling the raffinate phase through the column can increase the flow of non-aromatics to the second column. Unfortunately, increasing the flow of non-aromatic compounds to the second column can reduce the overall system efficiency. Usually, additional energy is introduced to the first column to remove the recycled non-aromatic overhead.

In addition, water may also be recycled in the first column. Unfortunately, insufficient separation of the water and solvent in the column may require additional equipment to remove solvent from the raffinate. As a consequence, there is a desirability to identify an extractive system for enhancing the efficiency of operating a column while minimizing the necessity of additional equipment for removing solvent from the raffinate.

SUMMARY OF THE INVENTION

One exemplary embodiment can be a process for minimizing a solvent in a raffinate stream of an extractive distillation column. The process can include providing sufficient separation in the extractive distillation column between a reflux stream having an effective amount of water, and a stream having an effective amount of solvent. Usually, the reflux stream has no more than about 2,000 ppm, by weight, solvent based on the weight of the reflux stream.

Another exemplary embodiment may be an aromatic extraction system. The system can include an extractive distillation column and a solvent recovery column. Generally, the extractive distillation column receives a reflux stream having at least about 99%, by weight, water based on the weight of the reflux stream above a top tray, and a solvent stream separated by at least about two trays from the reflux stream.

Yet another exemplary embodiment may be a process for minimizing a solvent in a raffinate stream of an extractive distillation column. The process can include providing sufficient separation in the extractive distillation column between a reflux stream having an effective amount of water, and a stream having an effective amount of solvent. Usually, the reflux stream has no more than about 3,000 ppm, by weight, aromatics based on the weight of the reflux stream.

The embodiments disclosed herein can provide a system that provides for the refluxing of water to the extractive distillation column. As such, the system can operate more efficiently to minimize the amount of non-aromatics sent to the solvent recovery column. Moreover, the system as disclosed herein can provide sufficient separation between the solvent and the reflux to minimize the amount of water, aromatics, and/or solvent in the reflux stream as well as the raffinate stream. As a result, the system can operate with greater efficiency to obtain higher product purities with less capital investment. As a consequence, the system can avoid additional equipment, such as a water wash column, and corresponding capital and operating investment costs.

DEFINITIONS

As used herein, the term "stream" can be a stream including various hydrocarbon molecules, such as straight-chain, branched, or cyclic alkanes, alkenes, alkadienes, and alkynes, and optionally other substances, such as gases, e.g., hydrogen, or impurities, such as heavy metals, and sulfur and nitrogen compounds. The stream can also include aromatic and non-aromatic hydrocarbons. Moreover, the hydrocarbon molecules may be abbreviated C1, C2, C3 ... Cn where "n" represents the number of carbon atoms in the one or more hydrocarbon molecules.

As depicted, process flow lines in the figures can be referred to as lines, pipes or streams. Particularly, a line or a pipe can contain one or more streams, and one or more streams can be contained by a line or a pipe.

BRIEF DESCRIPTION OF THE DRAWING

FIG. 1 is a schematic depiction of an exemplary aromatic extraction system.

DETAILED DESCRIPTION

Referring to FIG. 1, an aromatic extraction system or unit 100 can include an extractive distillation column 200 and its receiver 220, and a solvent recovery column 300 and its receiver 320. Exemplary extractive distillation columns and solvent recovery columns are disclosed in, e.g., U.S. Pat. No. 3,763,037.

Generally, the aromatic extraction system or unit 100 can receive a hydrocarbon stream 110. The hydrocarbon stream 110 can include one or more C6-C20 hydrocarbons, particularly about 15-about 90%, by weight, of one or more aromatic hydrocarbons based on the weight of the hydrocarbon stream 110. Usually, the hydrocarbon stream 110 can include any stream having a sufficiently high concentration of aromatic hydrocarbons to justify recovery. As an example, the hydrocarbon stream 110 can include a debutanized or a depentanized effluent from a conventional catalytic reforming unit. Another possible source for the hydrocarbon stream 110 can be a liquid by-product hydrotreated to substantially saturate olefins and diolefins from a pyrolysis gasoline unit. Typically, the hydrocarbon stream 110 can include a wide boiling range mixture including benzene, toluene, and xylenes in admixture with corresponding boiling range paraffins and naphthenes.

The extractive distillation column 200 can also receive a solvent stream 130. The solvent can be a compound possessing a five-member ring containing one atom of sulfur and four atoms of carbon with two oxygen atoms bonded to the sulfur atom of the ring, particularly 1,1-dioxide tetrahydrothiofuran, which may also be known as tetramethylene sulfone. Alternatively, other solvents can be used either alone or in combination, such as 2-sulfolene, 3-sulfolene, 2-methylsulfolane, 2-4-dimethyl-sulfolane, methyl-2-sulfonylether, an N-aryl-3-sulfonylamine, ethyl-3-sulfonyl sulfide, 2-sulfonylacetate, diethyleneglycol, a polyethyleneglycol, a dipropyleneglycol, a polypropyleneglycol, a dimethylsulfoxide, an N-methylpyrrolidone, a glycol-amine, an N-methyl-2-pyrrolidone, and an N-formyl morpholine. The solvent stream 130 can include an effective amount, preferably at last about 99%, by weight, of the one or more solvent compounds based on the weight of the solvent stream 130.

Typically, the extractive distillation column 200 can include any suitable number of trays. As depicted, the exemplary extractive distillation column 200 can include seventy trays. Generally, an overhead stream 210 can be provided to a receiver 220. The receiver 220 can form a boot 240 that can collect a reflux stream 250 that can include an effective amount, preferably at least about 99%, by weight, water based on the weight of the reflux stream 250. In addition, the receiver 220 can provide a raffinate stream 230, at least about 70%, by weight, of one or more non-aromatic compounds based on the weight of the raffinate stream 230. Generally, the reflux stream 250 can be provided above a top or a first tray, while the solvent stream 130 can be provided above a fifteenth tray, and the hydrocarbon stream 110 can be provided above a thirtieth tray (as indicated by numerals in the column 200). Although the streams 130 and 110 are depicted being provided above these trays, it should be understood that these streams 130 and 110 can be provided above any suitable tray. As such, this separation can result in the raffinate stream 230 having no more than about 2,000 ppm, by weight, of the solvent based on the weight of the raffinate stream 230.

In addition, the reflux stream 250 can contain no more than about 3,000 ppm, preferably no more than about 2,000 ppm, by weight, aromatics and no more than about 2,000 ppm, by weight, solvent based on the weight of the reflux stream 250. This is primarily accomplished by the separation of the reflux stream 250 and the solvent stream 130. Typically, there can be about two-about twenty trays, preferably about ten-about fifteen trays between the reflux stream 250 and the solvent stream 130 in the extractive distillation column 200 to provide the requisite separation.

Typical operating conditions of the extractive distillation column 200 can include a pressure of about 12-about 380 kPa, an overhead temperature of about 50-about 170° C., and a bottoms temperature of about 70-about 260° C., preferably about 180-about 200° C., e.g., with a 1,1-dioxide tetrahydrothiofuran solvent system. Generally, the solvent to feed volume ratio may be about 1:1-about 20:1 depending on the conditions in the column and the feed composition.

A bottom stream 270 from the extractive distillation column 200 can be provided to the solvent recovery column 300. An overhead stream 310 can be provided to the receiver 320. Generally, the receiver 320 can include a boot 330 that can separate water and provide a water stream 340. Optionally, this water stream 340 can be recycled back to the extractive distillation column 200. In addition, an extract stream 350, which can include at least about 98%, by weight, of one or more aromatic compounds based on the weight of the extract stream 350, can be provided as reflux stream 360 to the solvent recovery column 300 and another portion can be provided as a product stream 370. In addition, a bottom stream 380, including substantially solvent from the solvent recovery column 300, can be provided as a recycle to the extractive distillation column 200. Generally, the conditions in the solvent recovery column 300 can include a pressure of about 30-about 110 kPa and a bottoms temperature of about 80-about 230° C.

As disclosed herein, utilizing water as the reflux stream 250 can be effective for retaining the solvent in the extractive distillation column 200. Utilizing water can improve the system efficiency by reducing the flow of non-aromatics to the solvent recovery column 300.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for minimizing a solvent in a raffinate stream of an extractive distillation column, comprising:
    A) providing 2-20 tray separation in the extractive distillation column between a reflux stream comprising an effective amount of water and a stream comprising an effective amount of solvent wherein the reflux stream comprises no more than about 2,000 ppm, by weight, solvent based on the weight of the reflux stream, and wherein the reflux stream comprises at least about 99%, by weight, water based on the weight of the reflux stream.

2. The process according to claim 1, wherein the reflux stream comprises no more than about 3,000 ppm, by weight, of one or more aromatics based on the weight of the reflux stream.

3. The process according to claim 1, wherein the raffinate stream comprises at least about 70%, by weight, one or more non-aromatic compounds based on the weight of the raffinate stream.

4. The process according to claim 1, wherein the raffinate stream comprises no more than about 2,000 ppm, by weight, solvent based on the weight of the raffinate stream.

5. The process according to claim 1, wherein the solvent comprises at least one of 1,1-dioxide tetrahydrothiofuran, 2-sulfolene, 3-sulfolene, 2-methylsulfolane, 2-4-dimethylsulfolane, methyl-2-sulfonylether, an N-aryl-3-sulfonylamine, ethyl-3-sulfonyl sulfide, 2-sulfonylacetate, diethyleneglycol, a polyethyleneglycol, a dipropyleneglycol, a polypropyleneglycol, a dimethylsulfoxide, an N-methylpyrrolidone, a glycol-amine, an N-methyl-2-pyrrolidone, and an N-formyl morpholine.

6. The process according to claim 1, wherein the solvent comprises 1,1-dioxide tetrahydrothiofuran.

7. The process according to claim 1, further comprising feeding a hydrocarbon stream to the extractive distillation column.

8. The process according to claim 7, wherein the hydrocarbon stream comprises about 15-about 90%, by weight, of one or more aromatic hydrocarbons based on the weight of the hydrocarbon stream.

9. The process according to claim 7, wherein the hydrocarbon stream comprises one or more C6-C20 hydrocarbons.

10. The process according to claim 1, wherein the extractive distillation column provides a bottom stream to a solvent recovery column.

11. The process according to claim 10, wherein an extract stream is obtained from the solvent recovery column and comprises at least about 98%, by weight, of one or more aromatics based on the weight of the extract stream.

12. The process according to claim 1, wherein about ten-about fifteen trays separate the reflux stream and the solvent stream.

13. A process for minimizing a solvent in a raffinate stream of an extractive distillation column, comprising:
 A) providing a 2-20 tray separation in the extractive distillation column between a reflux stream comprising an effective amount of water and a stream comprising an effective amount of solvent wherein the reflux stream comprises no more than about 3,000 ppm, by weight, aromatics based on the weight of the reflux stream, and wherein the reflux stream comprises at least about 99%, by weight, water based on the weight of the reflux stream.

14. The process according to claim 13, further comprising providing a raffinate stream from the extractive distillation column having no more than about 2,000 ppm, by weight, solvent based on the weight of the raffinate stream.

15. The process according to claim 13, wherein the solvent comprises 1,1-dioxide tetrahydrothiofuran.

16. The process according to claim 13, further comprising feeding a hydrocarbon stream to the extractive distillation column.

17. The process according to claim 16, wherein the hydrocarbon stream comprises one or more C6-C20 hydrocarbons.

* * * * *